(12) United States Patent
Ren et al.

(10) Patent No.: US 11,002,904 B2
(45) Date of Patent: May 11, 2021

(54) DISPLAY DEVICE HAVING FRAME WITH HOLES

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Fujian Ren, Beijing (CN); Liang Li, Beijing (CN); Tianma Li, Beijing (CN); Dake Wang, Beijing (CN); Guohui Wang, Beijing (CN); Qijun Zhang, Beijing (CN); Donglong Lin, Beijing (CN); Shulin Qin, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/012,945

(22) Filed: Sep. 4, 2020

(65) Prior Publication Data
US 2021/0109277 A1 Apr. 15, 2021

(30) Foreign Application Priority Data
Oct. 14, 2019 (CN) .......................... 201921724456.7

(51) Int. Cl.
*F21V 8/00* (2006.01)

(52) U.S. Cl.
CPC .................................. *G02B 6/0088* (2013.01)

(58) Field of Classification Search
CPC ..................................................... G02B 6/0088
See application file for complete search history.

(56) References Cited

U.S. PATENT DOCUMENTS

2001/0050731 A1* 12/2001 An ....................... G02B 6/0088
349/58

FOREIGN PATENT DOCUMENTS

| CN | 103901646 A | * | 7/2014 | ............. G02B 6/009 |
| CN | 104678613 A | * | 6/2015 | ....... G02F 1/133528 |
| CN | 107993567 A | * | 5/2018 | ........... G06F 1/1601 |

* cited by examiner

*Primary Examiner* — Mary Ellen Bowman
(74) *Attorney, Agent, or Firm* — Myers Bigel, P.A.

(57) ABSTRACT

This application discloses a display device. The display device includes a display module, a frame surrounding the sides of the display module, a backlight module stacked with the display module, and a backplane. The frame includes holes. The backplane includes a main plane, side walls, and protrusions. The main plane is located on a side of the backlight module away from the display module. The side walls extend from the edges of the main plane toward the display module and are perpendicular to the main plane. The protrusions are located on the side walls and each of the protrusions is embedded in a corresponding one of the holes of the frame.

16 Claims, 9 Drawing Sheets

DISPLAY DEVICE HAVING FRAME WITH HOLES

RELATED APPLICATIONS

The present application claims the benefit of Chinese Patent Application No. 201921724456.7, filed on Oct. 14, 2019, the content of which is incorporated herein by reference in its entirety.

FIELD

This application relates to the technical field of display devices, and particularly relates to a display device having a frame which has holes.

BACKGROUND

A display device may have a frame surrounding a display panel. When the environment of the display device is relatively bad, the frame of the display device inclines to shrink, resulting in an abnormal color display of the display panel therein.

SUMMARY

According to an aspect of the present application, there is provided a display device. The display device comprises a display module, a frame surrounding sides of the display module, a backlight module stacked with the display module, and a backplane comprising a main plane, side walls and protrusions. The frame comprises holes. The main plane is located on a side of the backlight module away from the display module. The side walls extend from edges of the main plane towards the display module and are perpendicular to the main plane. The protrusions are located on the side walls, and each of the protrusions is embedded in a corresponding one of the holes of the frame.

In some embodiments, the display module comprises a liquid crystal display module.

In some embodiments, the frame comprises width increasing regions protruding toward the display module, and at least a part of the holes are located within the width increasing regions.

In some embodiments, two adjacent ones of the side walls form an angle, and a distance between each of at least a part of the protrusions and the angle is less than or equal to 3 mm.

In some embodiments, each of the two adjacent ones of the side walls is provided with at least one of the protrusions, the distance from which to the angle is less than or equal to 3 mm.

In some embodiments, a shape of the protrusions is a strip, and a direction of a longest edge of the strip is the same as a direction of a longest edge of the side wall where the strip is located.

In some embodiments, at least a part of the holes are open-end holes.

In some embodiments, at least a part of the holes are close-end holes.

In some embodiments, a material of the backplane comprises aluminum.

In some embodiments, the protrusions comprise bent protrusions.

In some embodiments, a protrusion length of the protrusions from the side walls is less than or equal to a depth of the holes.

In some embodiments, at least a part of the protrusions protrude from the side walls toward the display module in a direction perpendicular to the main plane of the backplane.

In some embodiments, each of the side walls comprises an outer surface and an inner surface opposite to the outer surface, and at least a part of the protrusions protrude from the side walls in a direction from the outer surface to the inner surface.

In some embodiments, the frame surrounds the side walls.

In some embodiments, the display device further comprises a protective film covering the frame.

In some embodiments, at least a part of the holes are open-end holes, and the protective film covers the open-end holes.

BRIEF DESCRIPTION OF THE DRAWINGS

In order to explain the technical solutions of the embodiments of the present application more clearly, drawings that need to be used in the description of the embodiments of the present application will be briefly introduced below. Obviously, the drawings only illustrate a part of the embodiments of the present application. The person having ordinary skill in the art can obtain other drawings based on these drawings without conducting inventive work. In the drawings, FIG. 1A schematically illustrates a top view of a display device according to an embodiment of the present disclosure.

DETAILED DESCRIPTION

The technical solutions of the embodiments of the present application will be clearly and completely described below in conjunction with the drawings in the present application. Obviously, the described embodiments are only part of the embodiments of the present application, rather than all of the embodiments. All other embodiments obtained by the person having ordinary skill in the art based on the embodiments in this application without doing inventive work fall within the protection scope of this application.

With the development of display technologies and the improvement of people's living standards, displays are applied to more and more fields, and people's requirements for display effects keep increasing. Some displays have a poor working environment. For example, car displays need to undergo temperature tests. In these processes, the temperature of the working environment of the displays is as high as 90° C.~95° C. or as low as −35° C.~−40° C. In such a working environment, the frame surrounding the display panel in the display can easily shrink and deform. This deformation of the frame is especially significant in the corner parts of the frame. The shrinkage of the frame may cause the corners of the display panel to be squeezed. If the display is a liquid crystal display, the shrinkage of the frame may change the influence of the liquid crystal molecules and the substrate on the light emitted by the backlight, resulting in abnormal color display at the corners. For example, a corner section of a squeezed liquid crystal display panel which originally intends to display black color may display a bluish color. This will affect the display effect and user experience.

The present disclosure provides a display device. The display device can be a liquid crystal display device. The display device can be, but is not limited to, home display products, office display products, industrial display products, vehicle-mounted display products or other devices with display functions, and can work in extreme working environments.

Figure 1A:
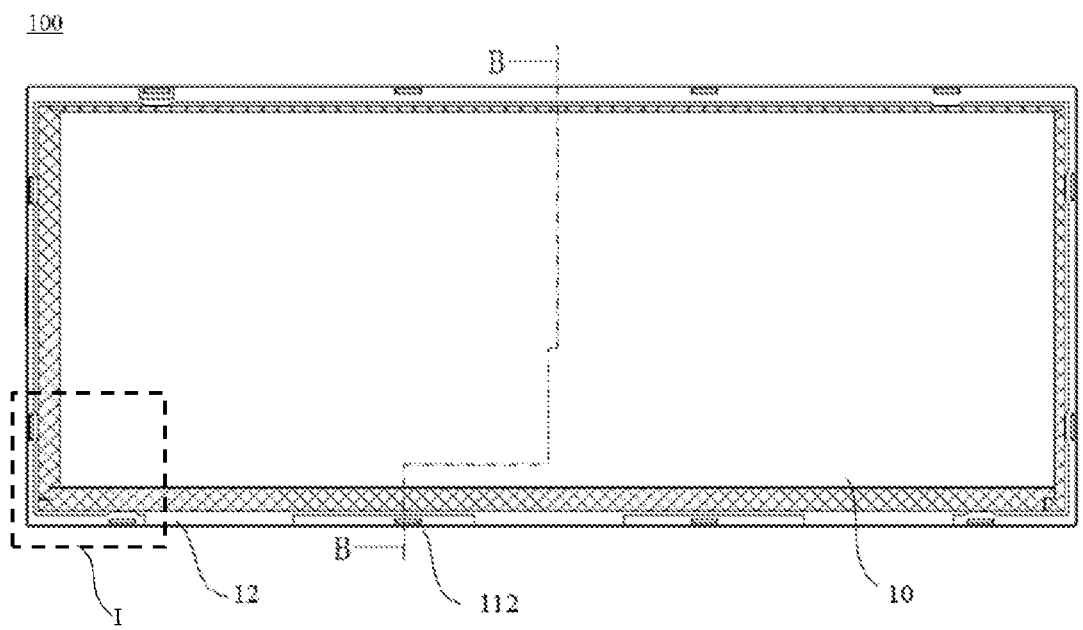
FIG. 1B schematically illustrates a partial enlarged view of FIG. 1A.
FIG. 1C schematically illustrates a partial perspective view of FIG. 1A.
Figure 1B:
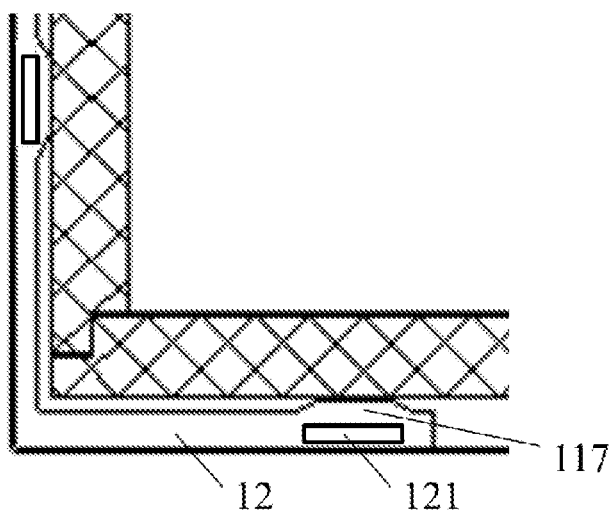
Figure 1C:
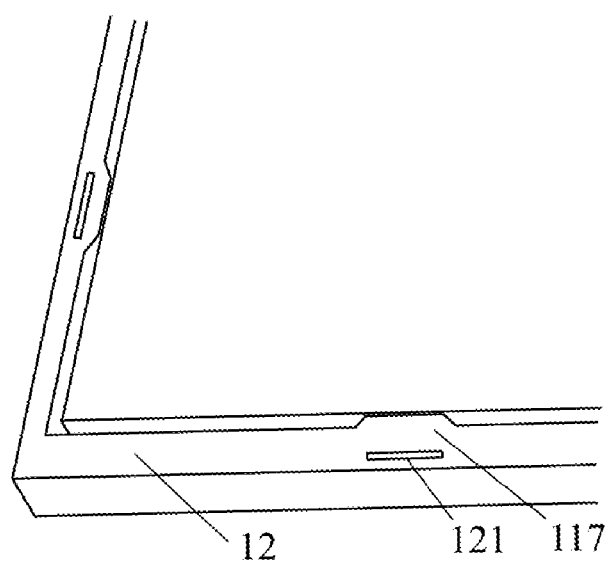
Figure 2:
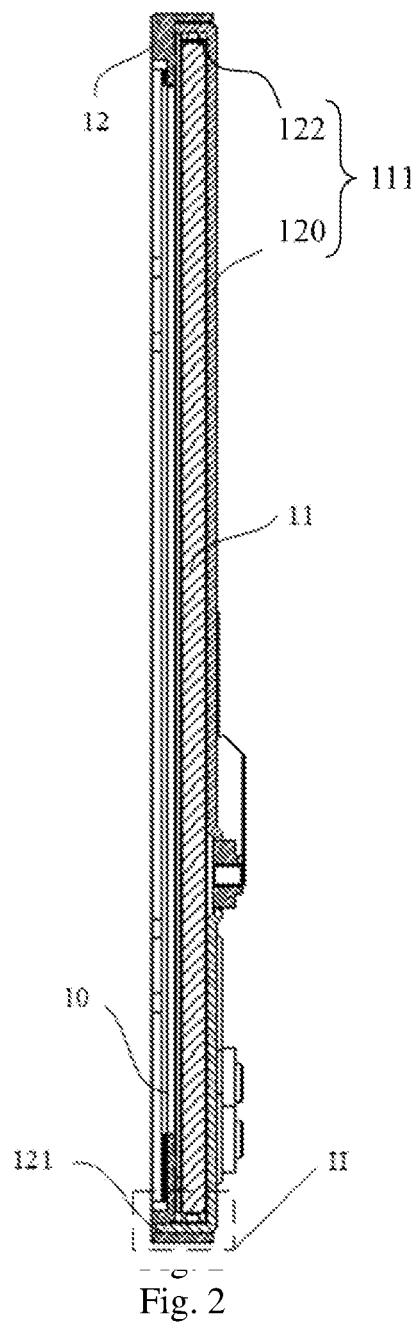
FIG. 2 schematically illustrates a cross-sectional view of the display device of FIG. 1A along the line B-B.
Figure 3:
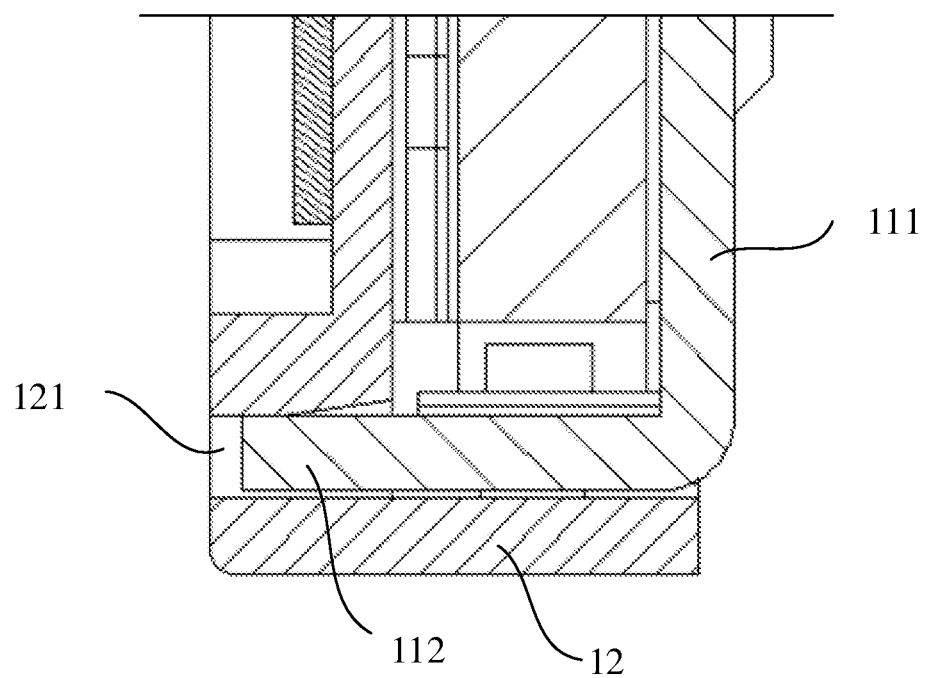
FIG. 3 schematically illustrates a partial enlarged view of FIG. 2.

FIG. 1A schematically illustrates a top view of a display device according to an embodiment of the present application. FIG. 1B schematically illustrates a partial enlarged view of a position I in FIG. 1A. FIG. 1C schematically illustrates a partial perspective view of the position I in FIG. 1A. FIG. 2 schematically illustrates a cross-sectional view of the display device of FIG. 1A along the line B-B. FIG. 3 schematically illustrates a partial enlarged view of a position II in FIG. 2.

Figure 4:
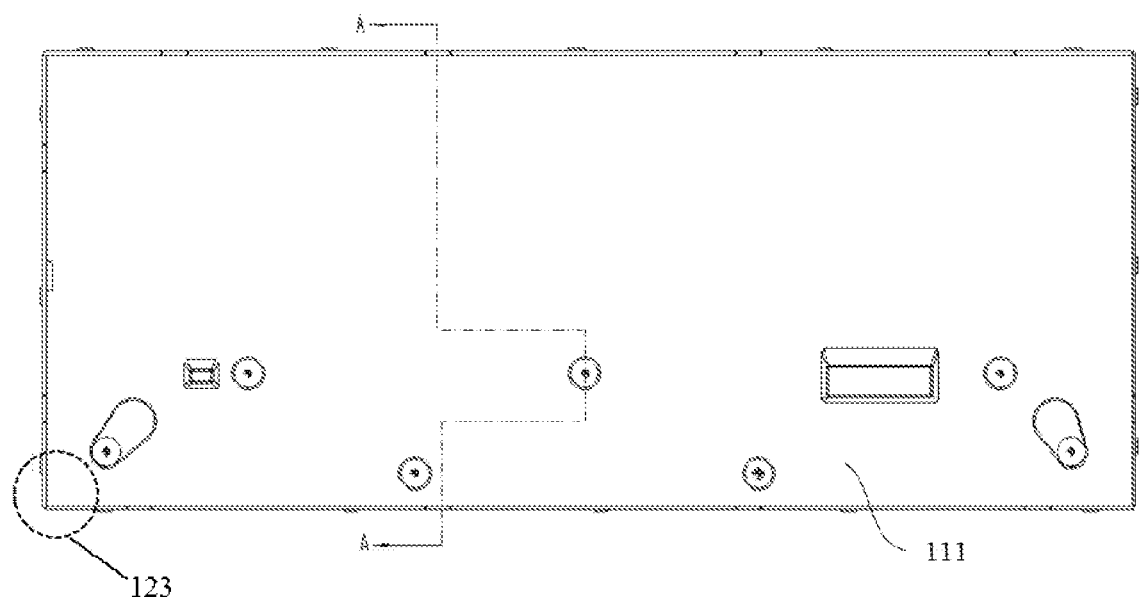
FIG. 4 schematically illustrates a top view of a backplane according to an embodiment of the present disclosure.
Figure 5:
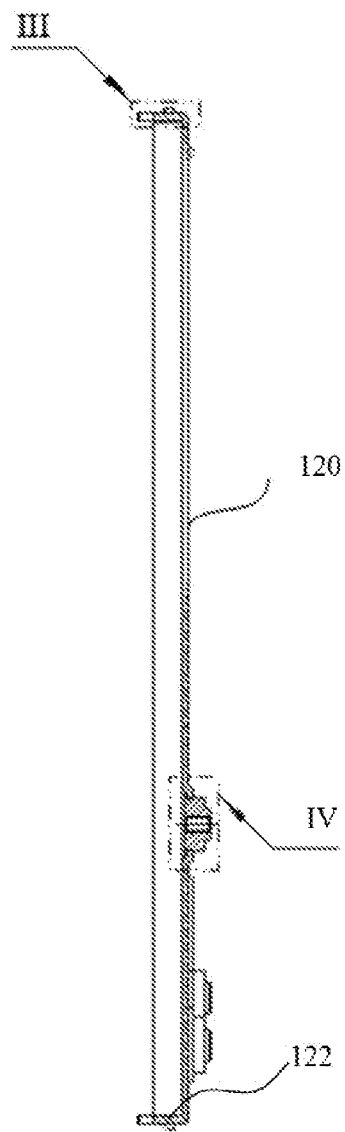
FIG. 5 schematically illustrates a cross-sectional view of the backplane of FIG. 4 along the line A-A.
Figure 6:
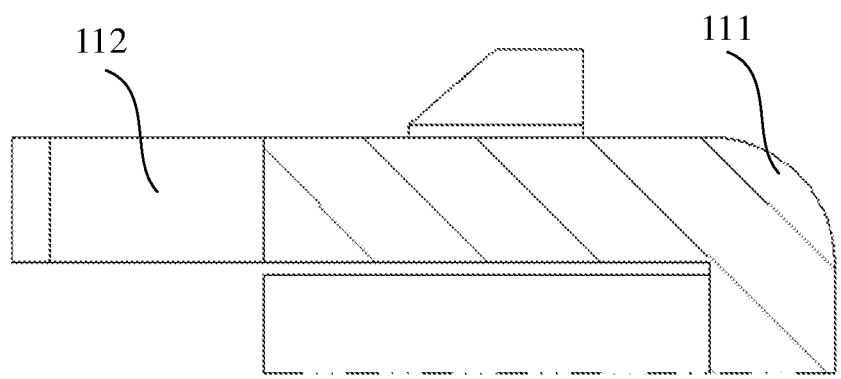
FIGS. 6 and 7 respectively schematically illustrate partial enlarged views of FIG. 5.
Figure 7:
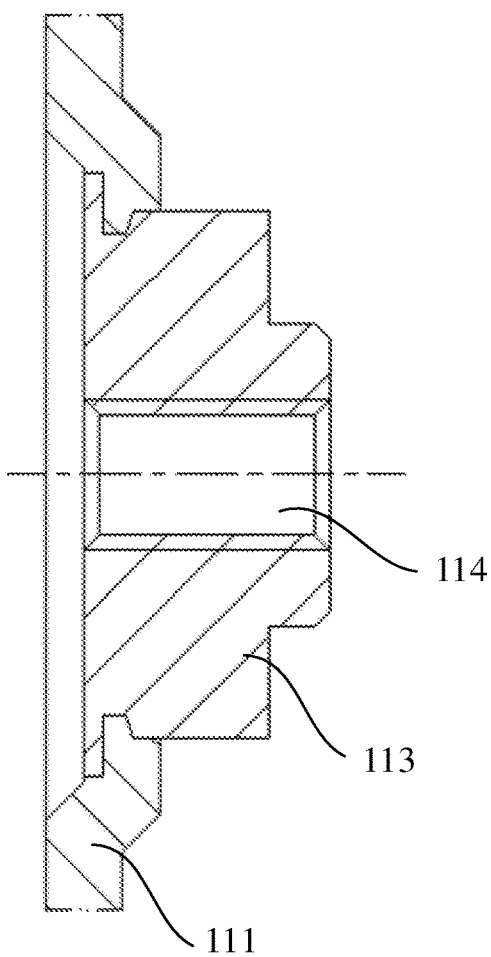

As shown in the figures, the display device 100 may include a display module 10, a backlight module 11, and a frame 12. The display module 10 can be a liquid crystal display module. The liquid crystal display module may include upper and lower polarizing plates, thin film transistor driving circuits, color film layers, liquid crystal layers, alignment films and other structures, which are not described in detail here. The liquid crystal display module can be understood as a combination of these components. The frame 12 may at least partially surround the sides of the display module 10. The backlight module 11 and the display module 10 are stacked. The backlight module 11 may include a light source, a light guide plate, a reflective layer and other structures, which are not described in detail here. The backlight module can be understood as a combination of these components. The light emitted from the backlight module 11 illuminates the display module 10. The display module 10 adjusts the brightness of the light emitted by the backlight module 11, and realizes the color display through the color film layer. A backplane 111 is provided on a side of the backlight module 11 away from the display module 10. FIG. 4 schematically illustrates a top view of the backplane. FIG. 5 schematically illustrates a cross-sectional view of the backplane of FIG. 4. FIG. 6 schematically illustrates a partial enlarged view of FIG. 5. FIG. 7 schematically illustrates another partial enlarged view of FIG. 5. The display module 10, backlight module 11 and backplane 111 are stacked sequentially. The backplane 111 includes a main plane 120 and side walls 122. The side walls 122 are located at the edge of the main plane 120 and may be substantially perpendicular to the main plane 120. The shape of the orthographic projection of the frame 12 on the plane where the main plane 120 is located is the same as the shape of the orthographic projection of the side walls 122 on the plane where the main plane 120 is located. The frame 12 may be divided into sides, and each side covers a side wall 122. During the manufacturing process, the side walls can be obtained by bending the edge portion of the main plane material board, so that the side walls and the main plane are integrated. As shown in FIG. 2, the main plane 120 of the backplane is located on the side of the backlight module 11 away from the display module 10. The side walls 122 of the backplane extend from the main plane 120 toward the display module 10, and surround the sides of the backlight module. The frame 12 at least partially surrounds the side walls 122 of the backplane 111. A part of the frame 12 extends between the display module 10 and the backlight module 11 to separate the two.

As shown in FIGS. 1A-1C, multiple holes 121 are provided on the frame 12. The term "hole" can be understood as a structure having at least one open end and a hollow space communicating with the end. As shown in FIGS. 1A, 2 and 3, the side walls 122 of the backplane 111 include multiple protrusions 112. The holes 121 on the frame 12 and the protrusions 112 are arranged in a one-to-one correspondence, so that each protrusion 112 on the backplane 111 can be embedded in a corresponding hole 121 of the frame 12.

In practical applications, the frame 12 is usually made of plastic material. It may be elastic and adhesive. Therefore, when the display device 100 is subjected to a high temperature/low temperature test, the frame 12 easily shrinks and deforms. Moreover, the deformation of frame 12 is particularly noticeable in the corner parts of the frame. When the corner parts of the frame 12 shrink and deform, the corner parts of the frame 12 can easily squeeze the corners of the display panel of the display module 10, causing the corners of the display module 10 to display abnormal colors. In the present disclosure, since the protrusions 112 on the backplane 111 are embedded in the hole 121 of the frame 12, when the display device 100 is in an extreme environment, the protrusions 112 can constrain the deformation of the frame 12, thereby reducing the squeezing force imposed on the display module 10 by the deformation of the frame 12. Through this arrangement, the undesirable phenomenon of abnormal color display at the corners of the display device can be reduced or even eliminated.

As shown in FIG. 4, in some embodiments, at least a part of the protrusions 112 may be disposed near the angle 123 of the backplane 111. The angle 123 of the backplane is the angle formed by two adjacent side walls 122 of the backplane 111. The expressions such as "near the angle" mean that the distance between the protrusion 112 and the angle is less than or equal to a preset value, for example, less than or equal to 0.8 mm, 1 mm, or 3 mm. The distance between an angle and a protrusion can specifically be the distance between the protrusion and the vertex of an angle. By arranging the protrusions 112 near the angle, the protrusions 112 can better constrain the corner parts of the frame 12 in order to reduce or avoid the shrinkage of the corner parts of the frame 12 and provide better processing performance, thereby reducing or avoiding the squeezing force on the corners of the display module 10 generated by the shrinkage of the frame 12, and in turn can reduce or eliminate the abnormal color at the corners of the display device.

In this application, the angle of the backplane 111 is the angle formed by two adjacent side walls 122, and specifically is an internal angle formed by the intersection of the two side walls. For example, for the backplane 111 having a rectangular main plane, referring to the direction shown in FIG. 1A, the upper and left side walls of the backplane 111 can form an upper left angle, the upper and right side walls of the backplane 111 can form an upper right angle, the lower and left side walls of the backplane 111 can form a lower left angle, and the lower and right side walls of the backplane 111 can form a lower right angle. Since the positions of the holes 121 on the frame 12 correspond to the positions of the protrusions 112 on the backplane 111, in the case where the protrusions 112 are close to the angles of the backplane 111, a part of the holes 121 on the frame 12 can also be set at the corner parts of the frame 12 accordingly.

Since a part of the protrusions 112 are set near the angles of the backplane 111, a part of the holes 121 on the frame 12 are correspondingly set at the corner parts of the frame 12. After the protrusions 112 are embedded in the holes 121, the protrusions 112 can be used to constrain the deformation of the corner parts of the frame 12. This can reduce or even eliminate the deformation of the corner parts of the frame 12, thereby reducing or avoiding the squeezing force of the frame 12 on the corners of the display module 10, so as to reduce or eliminate the undesirable phenomenon of abnormal colors at the corners of the display device 100.

In some embodiments of the present application, both of the two adjacent side walls forming the angle of the backplane 111 are provided with protrusions 112, and both sides of the corner part of the frame 12 are provided with holes 121 correspondingly. The protrusions 112 at both sides of the angle of the backplane 111 can be embedded in the holes 121 at both sides of the corner part of the frame 12, so that the deformation of the corner parts of the frame 12 can be constrained from both sides of the angle, which further improves the stability of the constraints by the protrusions 112 to the deformation of the corner parts of the frame 12.

For example, taking the lower left angle of the backplane 112 as an example, protrusions 112 can be set on both sides of the lower left angle of the backplane 112 (i.e., the left side wall and the lower side wall). Correspondingly, holes 121 can be provided at corresponding positions of the two sides of the lower left corner part of the frame 12 (i.e., the left part and the lower part of the frame). By embedding the protrusions 112 on the left side walls of the backplane 111 into the holes 121 on the left part of the frame 12, and embedding the protrusions 112 on the lower side wall of the backplane 111 into the holes 121 on the lower part of the frame 12, the deformation of the lower left corner part of the frame 12 can be constrained from the left part and the lower part of the frame 12 respectively, so as to improve the stability of the constraints by the protrusions 112 on the lower left corner part of the frame 12.

It can be understood that the above description is only about the example of the lower left corner part of the frame 12. The constraints of the upper left corner part, the upper right corner part, and the lower right corner part of the frame 12 can be understood with reference to the constraints of the lower left corner part, and will not be described in detail here.

Figure 8:
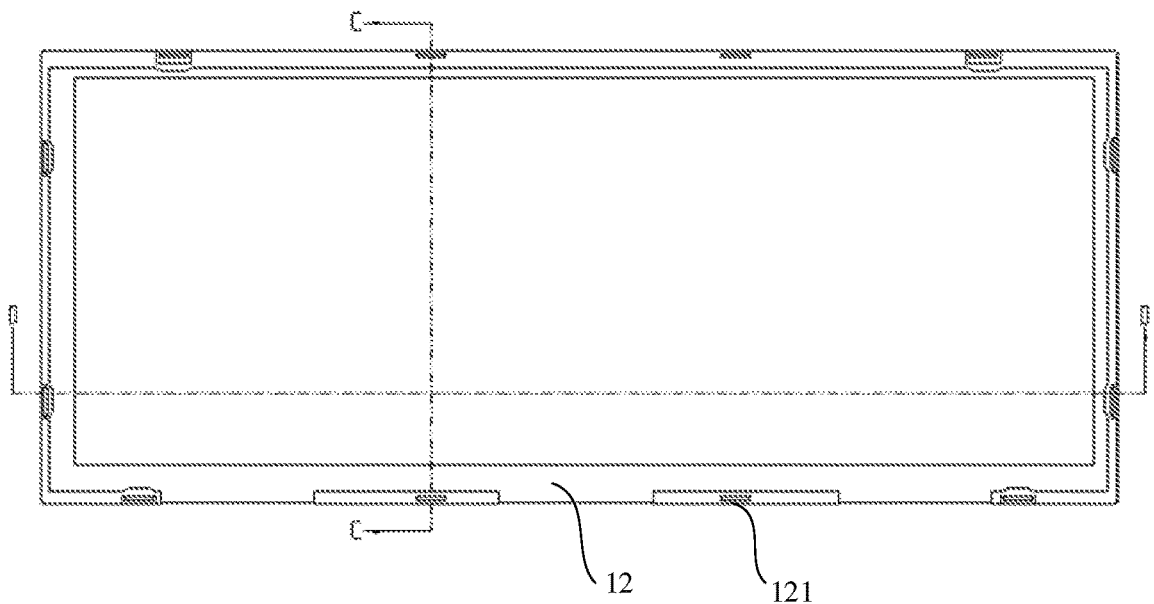
FIG. 8 schematically illustrates a top view of a frame according to an embodiment of the present disclosure.

FIG. 8 schematically illustrates a top view of a frame according to an embodiment of the present disclosure. In some embodiments, the frame 12 includes width increasing regions 117 protruding toward the display module 10. A part of the holes 121 may be located in the width increasing regions 117. The width increasing regions 117 are the contact parts between the frame 12 and the display module 10, which balance the force on the sides of the display module 10 imposed by the frame. As the holes 121 on the frame 12 reduce the effective width of the frame 12, the stability and force strength of the frame 12 will be weakened at the locations of the holes. By setting the holes 121 in the width increasing regions 117, the width increasing regions can be multiplexed to compensate for the influences of the reduction of the effective width of the frame.

In some embodiments, the shape of the protrusions 112 may be a strip. The term "strip" can be understood as a bar, and it means that the length of an object in one dimension is significantly longer than the length in the other two dimensions. Those skilled in the art can understand that the direction of the longest edge of the strip is the extension direction of the strip. In a specific embodiment, the shape of the protrusions 112 is similar to a cuboid, and the directions of each edge thereof are the same as the length and width directions of the rectangular main plane 120 of the backplane 111 and the direction perpendicular to the main plane 120, respectively. The direction of the longest edge of the protrusion 112 is the direction of the longest edge of the side wall where it is located. This can further improve the stability of the constraint by the protrusions 112 on deformation of the frame 12. Taking the directions shown in FIG. 1B as an example, the protrusion at the bottom of the figure has a horizontal extension direction. The horizontal edge of the protrusion is its longest edge. The bottom side wall also extends in the horizontal direction. The horizontal edge of the bottom side wall is its longest edge. As can be seen, the direction of the longest edge of the protrusion 112 is the same as the direction of the longest edge of the side wall on which the protrusion 112 is located.

In order to match the holes 121 on the frame 12 with the protrusions 112 on the backplane 111, when the shape of the protrusions 112 is a strip, the shape of the holes 121 on the frame 12 may also be a strip. The direction of the longest edge of the protrusion 112 is the same as the direction of the longest edge of the hole 121.

When the frame 12 is in a severe environment, such as when the display device is undergoing a temperature test, the frame 12 inclines to shrink in the extending direction of the side parts, which makes the deformation of the frame 12 particularly obvious at the corner parts. When the protrusions 112 are strips and the direction of the longest edge of the protrusions 112 is the same as the direction of the longest edge of the side walls of the backplane 111, the strength of the protrusions 112 along the direction of the longest edge of the protrusions 112 (i.e., the direction of the longest edge of the side walls of the backplane 111) can be higher than the strength on the other dimensions of the protrusions 112. In this way, the constraining effect of the protrusions 112 on the shrinkage of the frame 12 in its extending direction can be improved, and the stability of the constraint of the protrusions 112 on the deformation of the corner parts of the frame 12 can be improved.

In some embodiments, the cross section of the protrusions 112 perpendicular to the respective side walls 122 may be rectangular, elliptical, or hourglass-shaped, etc. Correspondingly, the shape of the holes 121 matches the shape of the protrusions 112.

In some embodiments, the holes 121 may be open-end holes. In other embodiments, the holes 121 may be close-end holes. An open-end hole indicates a hole with two openings that are connected. A close-end hole means that there is only one opening in the hole which leads to the hollow space. Those skilled in the art can set the holes 121 as open-end holes or close-end holes according to actual conditions.

In some embodiments, the material of the backplane 111 may include aluminum. More specifically, the backplane 111 may be a pure aluminum backplane or an aluminum alloy backplane. In the case that the backplane 111 is an aluminum backplane, the backplane 111 is lighter in weight, stronger in strength, and aesthetically more pleasing.

The aluminum backplane can be processed by stamping forming. In some embodiments, the protrusions 112 may be bent protrusions. The term "bent protrusions" can be understood based on the following description. The backplane has a main plane and side walls perpendicular to the main plane. The side walls can be obtained by bending the edge portions of the material of the main plane. Therefore, the side walls can be understood as the bending surface of the main plane 120. The protrusions 112 are provided on the bending surface. They can be an extension of the bending surface. Therefore, such protrusions 112 are called bent protrusions. The bent protrusions are located on the top of the side walls 122 of the backplane. The top of the side walls represents the top surface of the side walls which faces the display module. In the process of stamping forming of the backplane 111, the protrusions 112 on the top of the side walls can be stamped at the same time. This can improve the processing efficiency of protrusions 112.

In some embodiments, the height of the protrusions 112 is less than or equal to the depth of the holes 121. In this way, when the protrusions 112 are embedded in the holes 121, the protrusions 112 can be prevented from protruding out of the outer surface of the frame 12, so as to improve the appearance of the frame 12.

Figure 11:
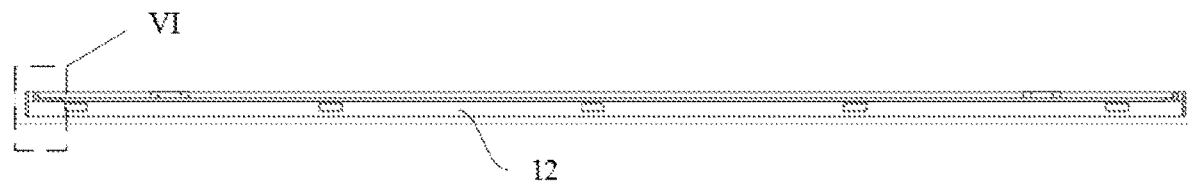
FIG. 11 schematically illustrates a cross-sectional view of the frame of FIG. 8 along the line D-D.
Figure 12:
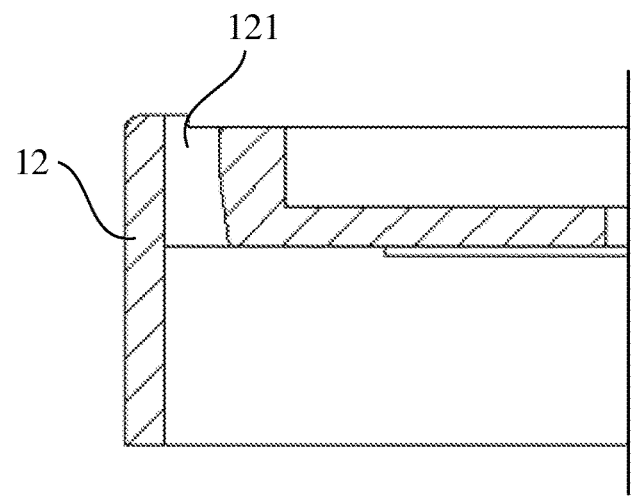
FIG. 12 schematically illustrates a partial enlarged view of FIG. 11.
Figure 13:
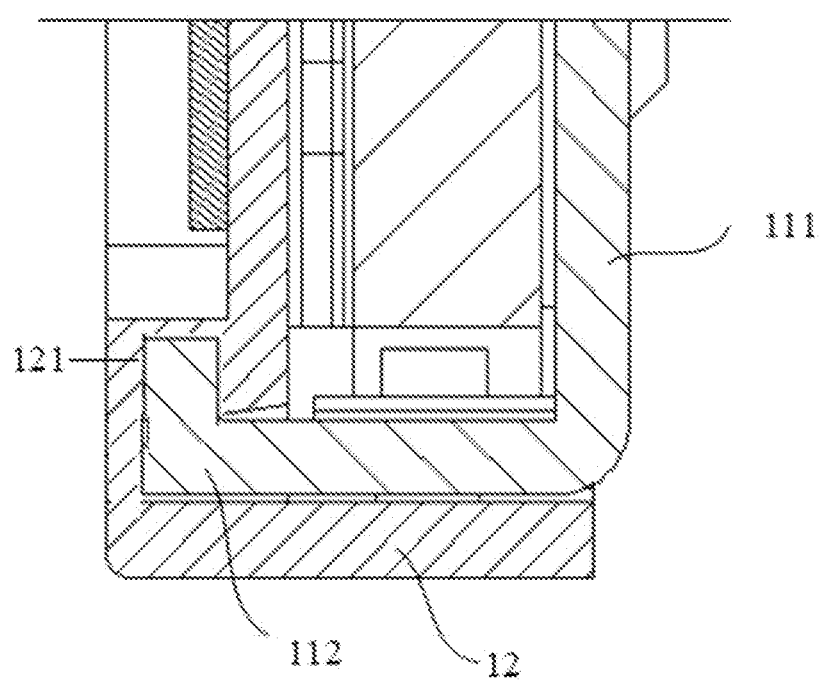
FIG. 13 schematically illustrates a partial enlarged view of a cross-sectional view of a display device according to another embodiment of the present disclosure.

FIG. 11 schematically illustrates a cross-sectional view of the frame of FIG. 8 along the line D-D. FIG. 12 schematically illustrates a partial enlarged view of FIG. 11. In some embodiments, the side walls of the backplane 111 and the main plane 120 form an accommodating cavity which can accommodate the backlight module. The side walls may extend starting from the edges of the main plane 120 of the backplane toward the display module in a direction perpendicular to the main plane 120. The side walls 122 may include an inner surface and an outer surface that are opposite to each other and perpendicular to the main plane 120, and a top surface and a bottom surface that are opposite to each other and in parallel to the main plane 120. The bottom surface is connected to and is an extension of the main plane 120. The inner surface faces the accommodating cavity, and the outer surface faces away from the accommodating cavity. In some embodiments, the protrusions 112 may be provided on the top surfaces of the side walls 122 of the backplane 111. In this case, the extending direction of the holes 121 of the frame 12 is perpendicular to the main plane 120 of the backplane 111. In other embodiments, as shown in FIG. 13, the protrusions 112 may be disposed on the inner surfaces of the side walls of the backplane 111. In this case, the extending direction of the holes 121 is in parallel to the main plane 120 of the backplane 111. The extending direction of the hole can be understood as the direction starting from one end of the hole to another end of the hole. If the hole only has one end, the extending direction of the hole is the direction from the end to the center of the hole.

Figure 9:
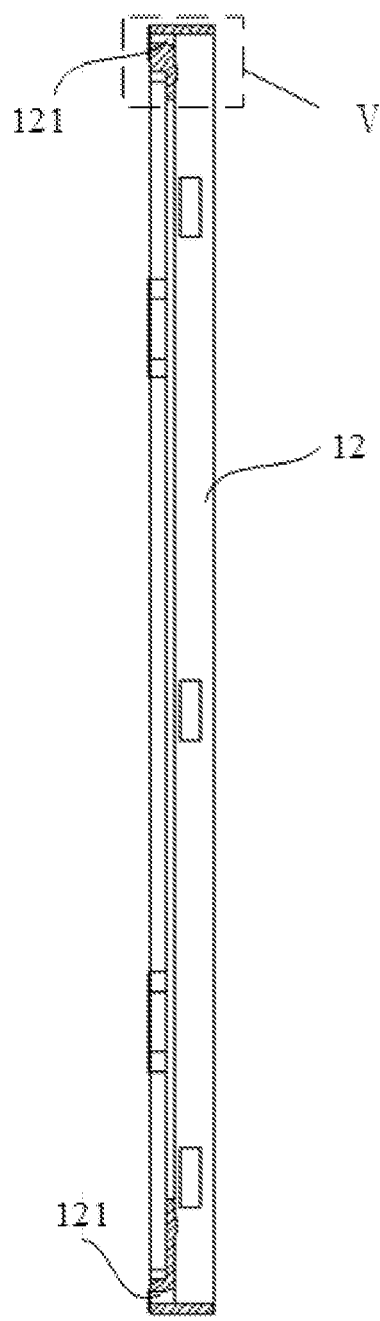
FIG. 9 schematically illustrates a cross-sectional view of the frame of FIG. 8 along the line C-C.
Figure 10:
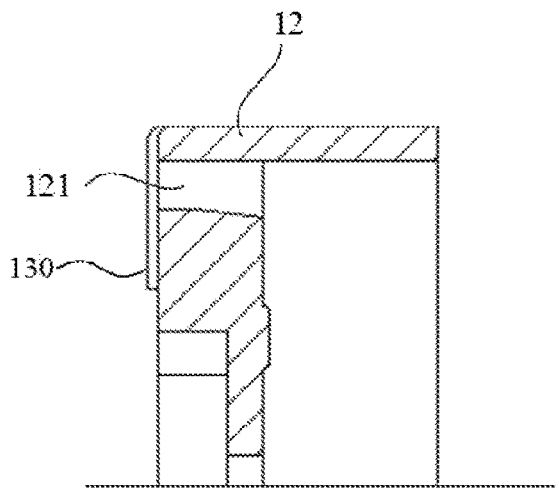
FIG. 10 schematically illustrates a partial enlarged view of FIG. 9.

FIG. 9 schematically illustrates a cross-sectional view of the frame of FIG. 8 along the line C-C. FIG. 10 schematically illustrates a partial enlarged view of FIG. 9. In some embodiments, the display module may also include a protective film 130. The protective film 130 is adhered to the frame 12. The protective film 130 may be a material that can provide adhesion, such as a polyacrylate (Cell Tape) material. The protective film may be a flexible protective film. In practical applications, the protective film is adhered to the frame 12, which can not only protect the frame 12 but also cover the holes 121 on the frame 12.

As shown in FIG. 7, a threaded mounting seat 113 is provided on a surface of the backplane 111 away from the display module 10. A threaded hole 114 is provided on the threaded mounting seat 113. The threaded hole 114 can be used for allowing a fastener to pass through to install the backplane 111 on a fixed bracket, or on a wall or a table.

In summary, since the backplane is provided with protrusions which can be embedded in the holes on the frame, the protrusions can be used to constrain the deformation of the frame during the temperature test of the display device, in order to reduce the deformation and the squeezing force imposed by the frame. In this way, when the backplane is used in a display device, it can reduce or eliminate the undesired phenomenon of abnormal color display at the corner positions of the display device.

Although some embodiments of the present application have been described, those skilled in the art can make additional changes and modifications to these embodiments based on the content of the present disclosure. The protection scope of the claims includes the embodiments recorded in the present disclosure and the above-mentioned changes and modifications.

Finally, it should be noted that in this article, the terms "comprise", "include" or any other variants thereof are intended to cover non-exclusive inclusion, so that a process, method, object or terminal device including a series of elements does not only include those elements, but also include other elements not explicitly listed, or also include the inherent elements of this process, method, object or terminal device. If there are no more restrictions, the elements defined by the word "comprising" do not exclude the existence of other same elements in the process, method, object, or terminal device that includes the elements.

The above are only specific implementations of this application, but the protection scope of this application is not limited thereto. Any changes or substitutions that can be thought by the person having ordinary skill in the art within the technical scope disclosed in this application should be covered within the protection scope of this application. Therefore, the protection scope of this application should be subject to the protection scope of the claims.

What is claimed is:

1. A display device, comprising:
   a display module;
   a frame surrounding sides of the display module, wherein the frame comprises holes;
   a backlight module stacked with the display module; and
   a backplane comprising a main plane, side walls and protrusions,
   wherein the main plane is on a side of the backlight module away from the display module, the side walls extend from edges of the main plane towards the display module and are perpendicular to the main plane, the protrusions are on the side walls, and each of the protrusions is embedded in a corresponding one of the holes of the frame, and
   wherein at least a part of the protrusions protrude from the side walls toward the display module in a direction perpendicular to the main plane of the backplane.

2. The display device according to claim 1, wherein the display module comprises a liquid crystal display module.

3. The display device according to claim 1,
   wherein the frame comprises width increasing regions protruding toward the display module, and wherein at least a part of the holes are within the width increasing regions.

4. The display device according to claim 1,
wherein two adjacent ones of the side walls form an angle, and
wherein a distance between each of at least a part of the protrusions and the angle is less than or equal to 3 mm.

5. The display device according to claim 4, wherein each of the two adjacent ones of the side walls is provided with at least one of the protrusions, the distance from which to the angle is less than or equal to 3 mm.

6. The display device according to claim 1,
wherein a shape of the protrusions comprises a strip, and
wherein a direction of a longest edge of the strip is same as a direction of a longest edge of the side wall where the strip is located.

7. The display device according to claim 1, wherein at least a part of the holes are open-end holes.

8. The display device according to claim 1, wherein at least a part of the holes are close-end holes.

9. The display device according to claim 1, wherein a material of the backplane comprises aluminum.

10. The display device according to claim 9, wherein the protrusions comprise bent protrusions.

11. The display device according to claim 1, wherein a protrusion length of the protrusions from the side walls is less than or equal to a depth of the holes.

12. The display device according to claim 1, wherein each of the side walls comprises an outer surface and an inner surface opposite to the outer surface, and at least a part of the protrusions protrude from the side walls in a direction from the outer surface to the inner surface.

13. The display device according to claim 1, wherein the frame surrounds the side walls.

14. The display device according to claim 1, further comprising:
a protective film covering the frame.

15. The display device according to claim 14,
wherein at least a part of the holes are open-end holes, and
wherein the protective film covers the open-end holes.

16. A display device, comprising:
a display module;
a frame surrounding sides of the display module, wherein the frame comprises holes;
a backlight module stacked with the display module; and
a backplane comprising a main plane, side walls and protrusions,
wherein the main plane is on a side of the backlight module away from the display module, the side walls extend from edges of the main plane towards the display module and are perpendicular to the main plane, the protrusions are on the side walls, and each of the protrusions is embedded in a corresponding one of the holes of the frame, and
wherein each of the side walls comprises an outer surface and an inner surface opposite to the outer surface, and at least a part of the protrusions protrude from the side walls in a direction from the outer surface to the inner surface.

* * * * *